Figure 1:
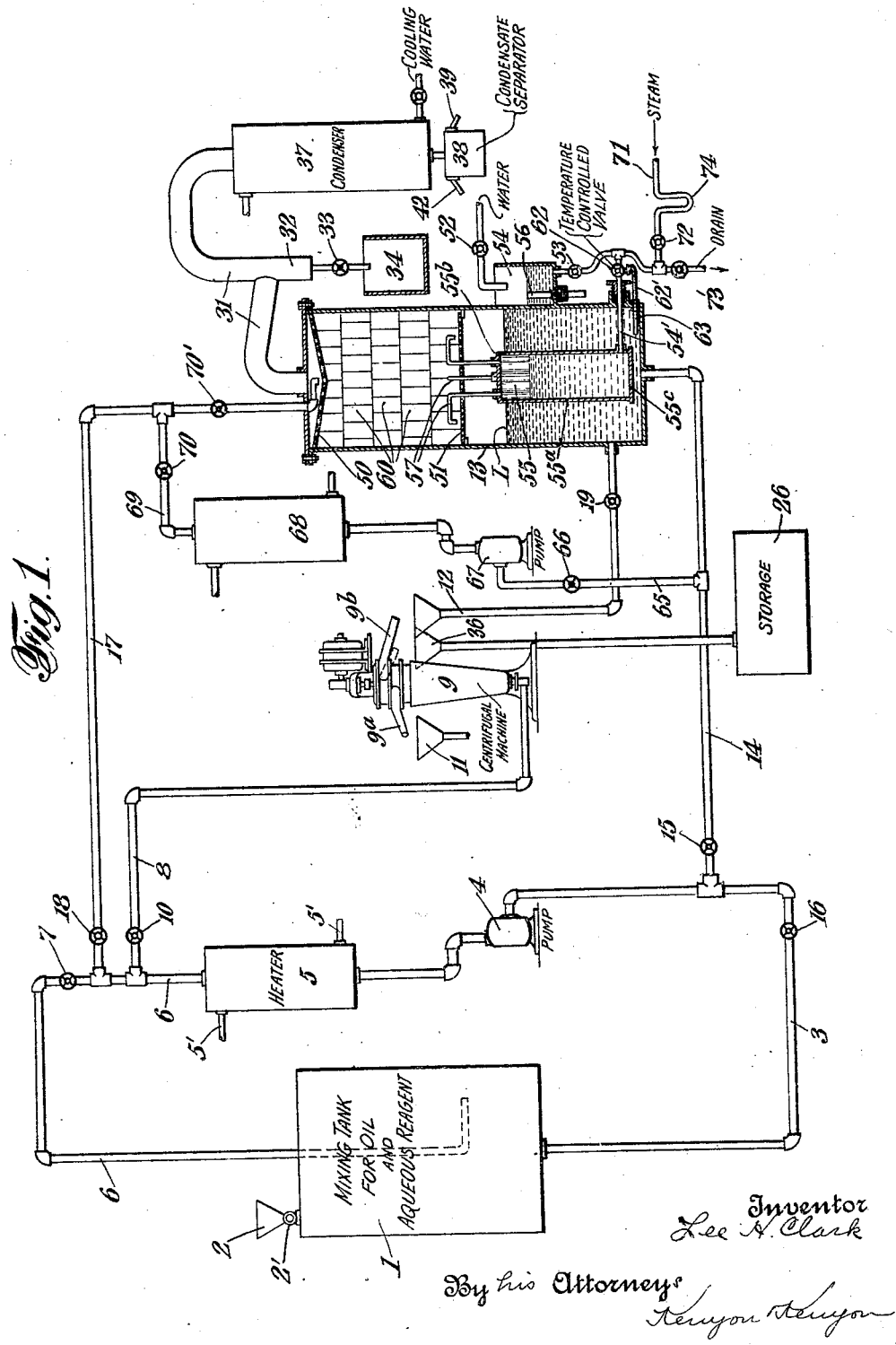

Jan. 13, 1931.  L. H. CLARK  1,788,911
PURIFICATION OF OIL
Filed Dec. 16, 1925  2 Sheets-Sheet 1

Inventor
Lee H. Clark
By his Attorneys
Kenyon & Kenyon

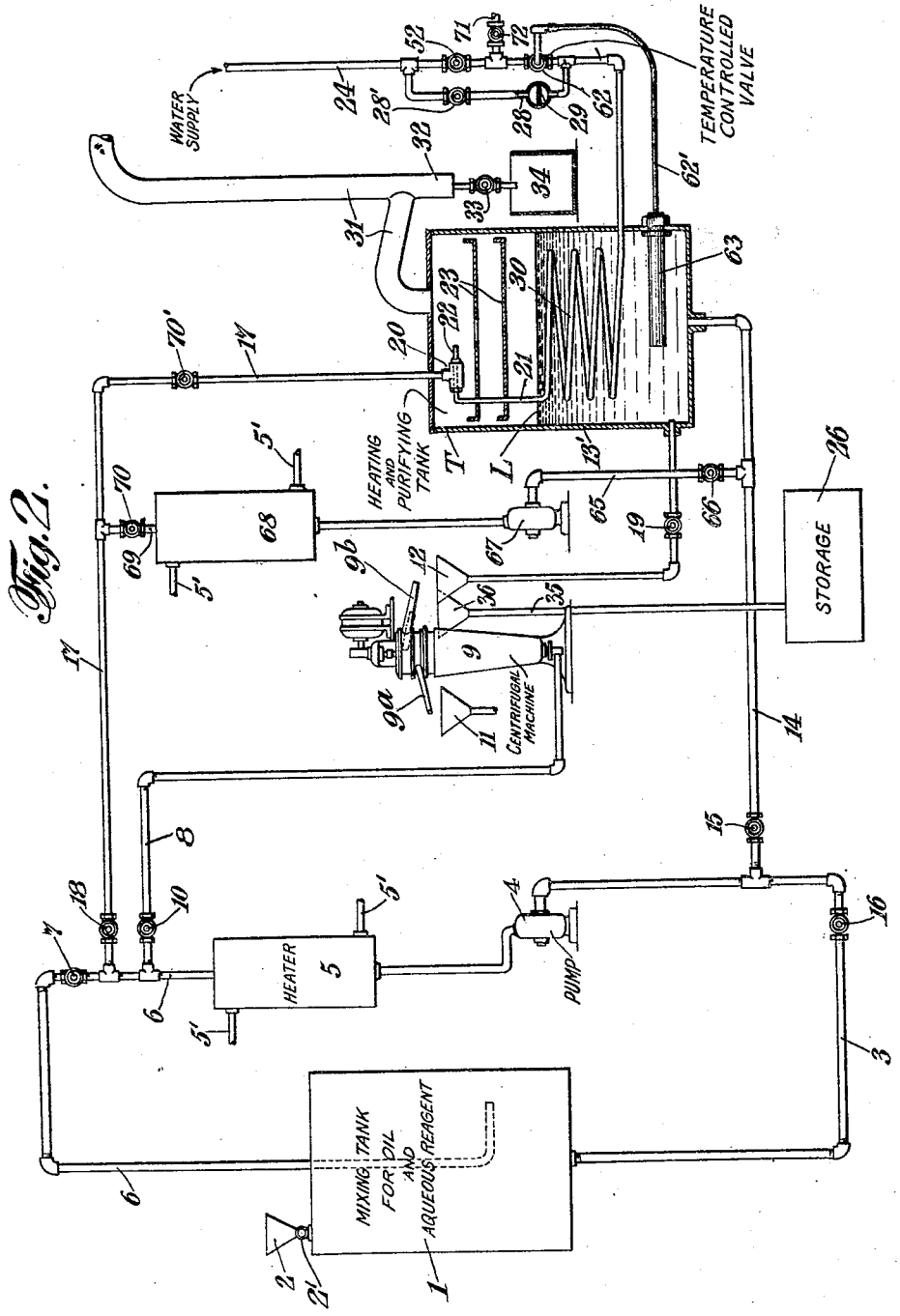

Patented Jan. 13, 1931

1,788,911

UNITED STATES PATENT OFFICE

LEE H. CLARK, OF HAVERFORD, PENNSYLVANIA, ASSIGNOR TO THE SHARPLES SPECIALTY COMPANY, OF PHILADELPHIA, PENNSYLVANIA, A CORPORATION OF DELAWARE

PURIFICATION OF OIL

Application filed December 16, 1925. Serial No. 75,683.

My invention relates to the purification of oil and particularly to a method and apparatus for the purification or restoration or renovation of oil that contains some or all of such impurities as products of decomposition or of chemical change in the oil or some of its constituents, free fatty acids, water, soaps, sludges usually having an acid reaction and of which some are insoluble in the oil and of which others are soluble in the oil at temperatures above atmospheric temperature, sludge forming substances, oil soluble liquid impurities of lower boiling point than the oil, finely divided carbon which may be wholly or in part colloidal, and other impurities, such impurities having been introduced into the oil during or by reason of the use made of the oil or otherwise.

An object of my invention is to provide a method and apparatus whereby oil that contains some or all of the undesirable substances above enumerated may be brought to a condition wherein it is well adapted to a particular use.

An important example of oil that contains impurities that are removed by the use or in the practice of my invention is oil that has been used for the lubrication of the cylinders of internal combustion engines and particularly such engines of that type as use light hydrocarbon fuel. By the use of my invention and in the practice thereof other oils containing similar impurities may be purified, another example being oil that has become polluted by having lower boiling liquids introduced into it in solution.

In the practice of my invention oils that contain some or all of the above mentioned impurities are first treated with an aqueous reagent that is preferably alkaline and may in some instances contain a colloidal substance, then certain impurities of the oil and the aqueous phase of the resulting mixture are separated from the oil preferably by centrifugal force, and then the oil which at this stage still contains contaminating imprities such as substances of lower boiling point than the oil that are left in solution therein, is freed of such contaminating impurities by a refining operation wherein steam is utilized and the dissolved contaminating impurities are removed at a temperature below their boiling point and below a temperature that would injure the quality of the oil. If desired the quantity of steam employed in this refining operation may be regulated automatically in proportion to the need therefor.

Other and further objects and advantages of my invention will appear from the following description and if it be desired that oil, treated in accordance with my present invention, have its resistance to the emulsification improved such improvement may be effected in accordance with the inventions described in my Patent No. 1,553,141, issued September 8, 1925, and in my co-pending applications Ser. No. 42,938, filed July 11, 1925, and Ser. No. 29,781, filed May 12, 1925.

In the practice of my invention aqueous reagent advantageously has the property of dispersing throughout the oil more readily than pure water and the property of faciliating or causing the passage of impurities of the oil from the oil to the interface between the aqueous reagent and the oil or through that interface into the aqueous reagent. Furthermore dispersion of the reagent throughout the oil, as by agitation, and also separation from the oil of impurities and the aqueous phase of the mixture, may be facilitated by reducing the viscosity of the oil as by raising the temperature thereof. The aqueous reagent may advantgeously consist of an aqueous solution of an alkaline substance such as sodium silicate, sodium aluminate or tri-sodium phosphate. Such alkaline substances as caustic soda and soda ash and still other alkaline substances may be used so long as they produce the desired effect while in solution.

In the practice of my invention the aqueous reagent is advantageously of such character that the water soluble products produced by the reaction between the aqueous reagent and the impurities of the oil shall all, or in major proportion, be in solution in the aqueous phase of the resulting mixture. An effective solution conforming to the requirements above specified may be produced by the use of sodium silicate, particularly sodium silicate in which silica predominates by weight, for example, in which there are 3.25 parts by weight of $SiO_2$ to each part of $Na_2O$ and in which there is an alkalinity, available under the existing conditions though not in every case initially free, equivalent to that of a solution containing $\frac{1}{4}\%$ to $1\%$ by weight of caustic soda, a solution having an alkalinity equivalent to such a $\frac{1}{2}\%$ solution of caustic soda having been generally found effective. Other substances such as sodium aluminate and tri-sodium phosphate may be used. I have found that it is desirable to have in the aqueous reagent a substance in colloidal form and if the compound used in the reagent does not contain or produce such colloidal substance some substance may be added that will impart thereto the desired colloidal characteristics or produce therein the desired colloidal component. In any event excessive alkalinity of the reagent is to be avoided in order that soaps present in the oil or formed with the fatty acid thereof may not be prevented from dissolving in the aqueous phase of the resulting mixture. In the practice of my invention the aqueous reagent is mixed with the oil that is to be purified, in the proportion of one to two parts by volume of aqueous reagent to each ten parts of oil to be purified. In mixing the aqueous reagent with the oil the mixture is advantageously maintained in a heated state, for example, 80° C. to 95° C. The mixing and agitation of the aqueous reagent with the oil may be carried out in various ways, a convenient way being hereinafter more particularly set forth.

The aqueous phase and impurities other than soluble contaminating liquids are then separated from the oil preferably by passing the oil through a centrifugal separator; and, I have found that no process has been suggested by others for purifying oil containing the above mentioned impurities whereby purification may be effected by the use of a centrifugal machine and I have found that no reagents heretofore suggested by others make centrifugal separation of such impurities possible.

Having removed substantially all impurities other than dissolved liquid impurities the next step in the practice of my invention is directed to the removal of such liquid impurities. These liquid impurities ordinarily include liquids having different boiling points. The temperature of the oil containing dissolved liquid impurities is raised either progressively as the oil discharges from the centrifuge or after a desired quantity of such oil has been collected. The temperature of the oil may advantageously be raised by circulating it through either a separate heater or the same heater that was employed to heat the mixture of impure oil and alkaline reagent. The first heating will drive off those of the contaminating liquids that have a relatively lower boiling point; and in order to remove also substantially all of the contaminating liquids of relatively higher boiling point the heated oil is brought into contact with an additional liquid or vapor thereof (e. g., water or water vapor, or steam). In the practice of my invention the contacting of additional vapor (e. g., steam) and oil containing dissolved impurities of lower boiling point than the oil may be effected in various ways. The heat of the oil may be employed to evaporate a body of additional liquid that is out of contact with the oil, and the resulting steam may be brought in contact with the oil. The additional liquid may be brought into contact with the heated oil, preferably by a rapid and thorough mixing thereof, so that steam produced by the heat of the oil immediately comes in contact with the oil. A source of low pressure steam that may be very moist can be employed if the steam is heated by the heat of the oil and out of contact therewith and then discharged into contact with the oil, or such steam may be directly brought into contact preferably by a rapid and intimate mixture therewith, the heat of the oil in either case evaporating any moisture therein and superheating such low pressure steam. By utilizing the heat of the oil to produce or dry or superheat the steam makes possible the substantially automatic regulation of the quantity of steam produced, such regulation being an important feature in my invention. As the absorption of added heat by evaporation of the lower boiling of the contaminated liquids diminishes or ceases, the added heat automatically becomes available for the production of water vapor that furthers the evaporation, at temperatures below their boiling points, of the contaminating liquids of relatively higher boiling points.

With different oils slight variations of the alkaline concentration of the reagent and of the proportion thereof that is mixed with the oil may be necessary to produce the best results. If the oil that is discharged from the centrifugal separator is found by examination or test to be sufficiently freed of impurities other than oil soluble contaminating liquids the alkaline concentration of the reagent and the proportion thereof that is mixed with the oil is correct, but if the oil does not appear to have been sufficiently freed of insoluble impurities, the alkaline concentration or the proportion thereof should be changed. Thus if the oil is not sufficiently freed of insoluble impurities and the aqueous discharge from the separator is turbid but light in shade the degree of the alkaline concentration should be increased. But, if the oil is not sufficiently purified and the aqueous discharge contains a high concentration of removed impurities the proportion of aqueous phase employed should be increased.

In order to assist in the understanding of my invention I will describe the purification of oil that has been used for the lubrication of cylinders of an internal combustion engine using gasoline as a fuel, by the use of apparatus embodying my invention, but it is understood that my invention is not limited to the purification of such oil.

In the drawings, Fig. 1 shows diagrammatically apparatus embodying and whereby my invention may be practised, Fig. 2 is a modification of the apparatus shown in Fig. 1, and Fig. 3 is a detail view of the oil and steam mixer.

While in the practice of my invention various devices may be used for effecting a thorough mixture of the aqueous reagent with the oil that is to be purified, the oil and the reagent may be introduced together into tank 1 through any convenient filling means such as the funnel 2 which may be closed off from tank 1 by valve 2'. In the purification of oil used in internal combustion engines of the type above referred to it is preferable that the reagent shall be made up from sodium silicate or sodium aluminate or sodium tungstate or other compound that will produce a colloidal substance in the reagent although other alkaline substances may be employed, for example, an aqueous solution containing 2% by weight of sodium silicate of the composition above set out. The oil and aqueous reagent are withdrawn from the bottom of tank 1 by means of pipe 3 and passed by means of pump 4 to heater 5 and thence through pipe 6 back into tank 1. The mixture is so circulated until it attains the desired degree of mixing and the desired temperature, in the neighborhood of 85° C. The source of heat in the heater 5 may be of any kind but in the construction indicated in the drawings heat may be supplied by passing steam or electric supply lines into and out of the passages 5'. Pipes 8 and 17 lead from the pipe 6 between heater 5 and valve 7 and during the heating and mixing operation are respectively closed by valves 10 and 18 as hereinafter described.

After the heating and mixing operation is completed the valve 7 is closed or partially closed and valve 10 is opened or partially opened so that heated and agitated mixture passes through pipe 8 to centrifugal separator 9, the agitation being continued with respect to any mixture passing through valve 7 and pipe 6 while mixture is being fed to the separator through pipe 8. The aqueous discharge from the separator comprising the aqueous phase of the mixture and impurities passes out through the separator spout 9a into a waste pipe 11 and oil passes from the separator through spout 9b and through the pipe 12 into the purifying tank 13, the tank 13 being in the nature of a still.

The purifying tank or still 13 contains perforated plates 50 and 51 between which is contained tower packing 60 preferably consisting of short tubular pieces of stone ware or spiral tower packing. In the lower part of the tank 13 and mainly below the final oil level therein is located a steam generator or chamber 55 preferably constructed to provide a large heating surface, the generator or chamber shown in the drawings consisting of a cylindrical corrugated side wall 55a and heads 55b and 55c. For the purpose of maintaining liquid at the proper level within the generator 55 a supply tank 54 provided with an adjustable overflow 56 is connected to the steam generator as by pipe 54' that is controlled by valve 53. Liquid such as water that is supplied to tank 54 through the valve 52 will stand at a level in tank 54 that is fixed by adjustment of the upper level of the overflow pipe 56. Extending from the top of the steam generator 55 and preferably through perforated plate 51 and into the zone of tower packing 60 are steam or vapor distributing pipes 57 that preferably discharge downwardly. If steam is available and particularly where available steam is at low pressure and moist, valve 53 may be kept closed and steam may be supplied to generator 55 through pipe 71 that is controlled by valve 72. A drain 73 is provided for the removal of water from the system. If the steam is very wet a steam trap 74 may be used.

Heating of the oil may be begun as soon as oil begins to enter tank 13 from centrifuge 9 or oil may be collected in tank 13 up to the level L and the centrifuge put out of operation before the heating of the oil is begun. If oil is brought to the level L in tank 13 before heating thereof begins the oil may be conducted from the bottom of tank 13 to pipe 14 controlled by valve 15 and delivered to the suction side of pump 4 by introducing it into a pipe 3 at a point between pump 4 and valve 16 therein. With valves 7, 10 and 16 closed and valve 18 open oil passes from heater 5 through pipe 17 and is discharged within tank 13 on top of perforated plate 50, plate 50 acting to distribute the oil over tower packing 60. For any heating of the oil in tank 13, and particularly when the heating of such oil is begun before operation of centrifuge 9 is discontinued, oil may be led from the pipe 14 between tank 13 and valve 15, by pipe 65 controlled by valve 66 to pump 67 that passes oil through heater 68 and into pipe 17, between tank 13 and valve 18, by pipe 69 controlled by valve 70. When either heater is used the first heating will effect an evaporation of the lowest boiling of the contaminating liquids. When heating of the oil is begun the steam generator or chamber 55 is preferably empty and valves 53 and 72 and 73 are closed. Preferably no steam is brought into contact with the oil until the oil is at a temperature high enough to avoid such condensation of the steam as would cause water to drop into the body of oil and make the operation uneven. After the oil has been heated to approximately 120° C. to 130° C. steam or water may be introduced to the chamber 55. If water is to be introduced the valve 53 is opened and water rises in the generator or chamber 55 to the level to which the top of the overflow pipe 56 has been adjusted and the heat of the oil immediately starts the evaporation of the water so that steam passes out of distributing pipes 57 and rising contacts with the surface of the oil that is spread over the tower packing 60 as it flows from the perforated plate 50 down toward the bottom of tank 13. As contaminating liquids of relatively lower boiling points are driven off in the form of vapor the absorption of heat by such contaminating liquids diminishes or ceases and more heat thus becomes available for the production of steam that facilitates the removal of contaminating liquids of higher boiling points, such contaminating liquids of relatively higher boiling points being thereby separated from the oil at a desirable temperature below any temperature that would injure the quality of the oil and below the boiling points of such contaminating liquids, e. g. the temperature of the oil being between 130° C. and 200° C. The steam and vapors of contaminating liquids pass out through pipe 31, any condensation in pipe 31 being caught in trap 32 and discharged through valve 33 into collecting chamber 34. Pipe 31 may pass to any desired condenser or discharge in the atmosphere.

If chamber or generator 55 is used for producing vapor from liquid it may be so designed that with a heater of given capacity the oil may be maintained at the desired temperature to effect distillation of contaminating liquids as heat will be absorbed from the oil in accordance with the rate of evaporation of such liquid in chamber 55; but in some cases it may be desirable to ensure maintenance of the proper temperature of the oil by limiting the quantity of liquid entering chamber 55 and therefore controlling the effective heating surface of chamber 55 so that less liquid will be evaporated and more heat will remain in the oil. Limitation of the quantity of liquid passing to chamber 55 may be effected by adjustment of the upper level of the overflow pipe 56 or by providing an additional control valve 62 in pipe 64 that is controlled by thermostatic element 63 that is subject to the temperature of the oil and operates valve 62 through suitable connection 62'. If valve 53 is closed and liquid is not introduced to chamber 55 and valve 72 is open so that low pressure steam that is perhaps moist is entering chamber 55, valve 62 may be dispensed with in the use of either steam or water.

If heater 5 or heater 68 is heated by electricity less current will be required as low pressure steam is used and merely dried or superheated by the heat of the oil before being brought into contact therewith.

If it is desired to secure contact of heated oil containing contaminated liquids by mixing the oil with additional liquid such as water or vapor thereof, such as steam or both liquid and vapor, apparatus of the general character of that shown in Figs. 2 and 3 may be employed, it being understood that many variations may be made in such apparatus so long as the object thereof is accomplished. In the apparatus shown in Figs. 2 and 3 tank or still 13' constitutes a modification of tank or still 13 shown in Fig. 1. Water supplied through valve 52 or low pressure steam supplied through valve 72 passes through a heat interchange device that is heated by the oil such as coil 30 and steam or steam and water passing through pipe 21 are then well mixed with heated oil entering tank 13' through pipe 17 in a mixer such as a mixer 20. The oil and steam or steam and water are then spread as by fan shaped nozzle 22 of mixer 20 over the surface of the oil in tank 13' or upon baffles 23.

In the operation of the construction shown in Fig. 2 the heating of the oil may be begun by use of heater 68 as soon as oil begins to enter tank 13' or the oil may be brought to some level "L" in tank 13' and the operation of centrifuge 9 discontinued before heating begins; in the latter operation heater 68 could be dispensed with and the heating effected by heater 5. As soon as the heating of the oil containing contaminating liquids is begun it may be desirable to start a flow of water for the production of steam and to that end bypass 28 controlled by valve 28' and containing orifice 29 may be provided around valves 52 and 62.

In the practice of my invention the distillation operation is continued until the contaminating liquids of relatively higher boiling point have been substantially removed from the oil, one or more of such characteristics as viscosity or flash or fire points of the oil being taken as an indication of this condition. The oil may again advantageously be passed through centrifuge 9 by closing valve 18 and opening valve 10. The spout 9b is swung to a position over the funnel 36 so that oil passes through the pipe 35 to the storage tank 26.

While I have described my invention in considerable detail I do not intend that my invention shall be limited to such details but intend that it shall include such modifications and variations as fall within the hereunto appended claims. In this connection it is noted that heaters 5 and 68 and their respectively associated pumps 4 and 67 may be employed in various ways under different circumstances. Heater 5 or heater 68 or both heaters and their associated pumps may be employed by proper adjustment of valves, including valve 70, in the heating and agitating of mixture in tank 1. If centrifuged oil is being heated as it accumulates in tanks 13, 13', heater 68 may be employed to heat such oil as it accumulates while heater 5 may be employed to maintain at a proper temperature mixture passing to the centrifuge 9; and after tanks 13 or 13' have received a full charge of centrifuged oil and centrifuge 9 is shut down both heater 5 and heater 68 and their associated pumps may be employed to heat centrifuged oil and circulate it through tanks 13 or 13'. Either pump 4 or pump 67 may be used to pass to the centrifuge oil freed of dissolved impurities. The temperature of the oil in tanks 13 or 13' may be regulated by regulating the quantity of water or low pressure steam or both that is in heat exchange relation with the oil. While any type of condenser may be used for the steam and vapors passing from the still through the pipe 21, I have shown a water cooled condenser 37 that discharges condensed steam and gasoline or kerosene into a condensate separator 38 from which gasoline and kerosene discharge through outlet 39 while water discharges through outlet 40.

What I claim and desire to secure by Letters Patent of the United States is:

1. In the purification of oil that contains products of decomposition, free fatty acids, carbon particles, and relatively lower boiling contaminating liquids in solution the process which comprises first mixing the oil with an aqueous alkaline reagent, separating impurities and the aqueous phase of the resulting mixture from the oil, then heating the oil and passing another liquid into heat exchange relation with the heated oil and thereby producing vapor and bringing it into contact with heated oil for the furtherance of the evaporation therefrom of contaminating liquids in solution.

2. In the purification of oil that contains products of decomposition, free fatty acids, carbon particles, and relatively lower boiling contaminating liquids in solution, the process which comprises first mixing the oil with an aqueous alkaline reagent having the property of facilitating the passage of carbonaceous impurities from the oil into the aqueous phase of the resulting mixture and sufficiently dilute that water soluble impurities and water soluble products of any reaction produced by the reagent will substantially all be in solution in the aqueous phase of the resulting mixture, separating impurities and the aqueous phase of the resulting mixture from the oil, and then steam refining the oil.

3. In the purification of oil that contains products of decomposition, free fatty acids, carbon particles, and relatively lower boiling contaminating liquids in solution, the process which comprises first mixing the oil with an aqueous alkaline reagent having the property of facilitating the passage of carbonaceous impurities from the oil into the aqueous phase of the resulting mixture, separating impurities and the aqueous phase of the resulting mixture from the oil, then steam refining the oil, and then passing the oil through a centrifugal machine to remove immiscible impurities.

4. In the purification of oil that contains products of decomposition, free fatty acids, carbon particles, and relatively lower boiling contaminating liquids in solution, the process which comprises first mixing the oil with an aqueous alkaline reagent, separating impurities and the aqueous phase of the resulting mixture from the oil, then heating the oil, and vaporizing water by the heat of the oil and bringing the water vapor into contact with heated oil to further evaporation of contaminating liquids from the oil.

5. In the purification of oil that contains products of decomposition, free fatty acids, carbon particles, and relatively lower boiling contaminating liquids in solution, the process which comprises first mixing the oil with an aqueous alkaline reagent containing a colloidal compound and sufficiently dilute that water soluble impurities and water soluble products of any reaction produced by the reagent will substantially all be in solution in the aqueous phase of the resulting mixture, centrifugally separating impurities and the aqueous phase from the oil, heating the oil, and vaporizing water by the heat of the oil and bringing the water vapor into contact with heated oil to further evaporation therefrom of contaminating liquids.

6. In the distillation from oil of dissolved liquids of relatively lower boiling point the process which comprises supplying heat to the oil, bringing another liquid into non-contacting heat exchange relation with the heated oil and contacting the resulting vapor with heated oil to further evaporation of said dissolved liquids from the oil, and controlling the temperature of the oil by regulating the rate of which said other liquid is brought into heat exchange relation therewith.

7. In the purification of oil used for the lubrication of cylinders of light-hydrocarbon internal combustion engines, the process which comprises mixing the oil with an aqueous alkaline reagent, separating from the oil impurities and the aqueous phase of the resulting mixture, heating the oil, and vaporizing water by the heat of the oil and bringing the water vapor into contact with heated oil to further evaporation therefrom of contaminating liquids.

8. In the purification of oil used for the lubrication of cylinders of light-hydrocarbon internal combustion engines, the process which comprises mixing the oil with an aqueous alkaline reagent, separating from the oil impurities and the aqueous phase of the resulting mixture, heating the oil, and passing water into heat exchange relation with the oil in co-directional variation by quantity with the temperature of the oil to further evaporation therefrom of contaminating liquids.

9. In the purification of oil used for the lubrication of cylinders of light-hydrocarbon internal combustion engines, the process which comprises mixing the oil with an aqueous alkaline reagent containing a colloidal substance and sufficiently dilute that water soluble impurities and water soluble products of any reaction produced by the reagent will substantially all be in solution in the aqueous phase of the resulting mixture, separating impurities and the aqueous phase from the oil, heating the oil, and vaporizing water by the heat of the oil and bringing the water vapor into contact with heated oil to further evaporation therefrom of contaminating liquids.

10. In the purification of oil used for the lubrication of cylinders of light-hydrocarbon internal combustion engines, the process which comprises mixing the oil with an aqueous solution of sodium silicate sufficiently dilute and in sufficient proportion that water soluble impurities and water soluble products of any reaction produced by the reagent will substantially all be in solution in the aqueous phase of the resulting mixture, separating impurities and the aqueous phase from the oil, heating the oil, and vaporizing water by the heat of the oil and bringing the water vapor into contact with heated oil to further evaporation therefrom of contaminating liquids.

11. In the purification of oil used for the lubrication of cylinders of light-hydrocarbon internal combustion engines, the process which comprises mixing the oil with an aqueous alkaline reagent, separating from the oil impurities and the aqueous phase of the resulting mixture, heating the oil, passing a predetermined quantity of water into heat exchange relation with the heated oil during the lower temperature heating thereof, and increasing the quantity of water in proportion to the temperature thereof.

12. In a process for the purification of oil used for the lubrication of cylinders of light-hydrocarbon internal combustion engines, the steps comprising heating the oil, vaporizing the water by passing the same into heat exchange relation with the heated oil in liquid state and contacting the water vapor and heated oil to effect evaporation therefrom of contaminating liquids.

13. In a process for the purification of oil used for the lubrication of cylinders of light-hydrocarbon internal combustion engines, the process which comprises heating the oil, and passing water into heat exchange relation with the oil in co-directional variation by quantity with the temperature of the oil to produce steam to further evaporation of contaminating liquids from the oil.

14. In the distillation from oil of dissolved liquids of relatively lower boiling point the process which comprises heating the oil, evaporating water by the heat of the oil and contacting heated oil and resulting steam to further evaporation from the oil of the lower boiling liquids, and controlling the temperature of the oil by regulation of the quantity of water subject to the heat of the oil.

15. In the purification of oil used for the lubrication of the cylinders of light-hydrocarbon internal combustion engines, the process which comprises treating the oil with an aqueous alkaline agent, separating from the oil impurities and the aqueous phase of the resulting mixture, heating the oil, evaporating water by the heat of the oil, and passing heated oil counter-current to the resulting steam.

16. In the purification of oil used for the lubrication of the cylinders of light-hydrocarbon internal combustion engines, the process which comprises treating ten parts of the oil with one to two parts by volume of an aqueous alkaline reagent containing a colloidal component and having an available alkalinity equivalent to a solution containing ¼% to 1% of caustic soda, separating from the oil impurities and the aqueous phase of the resulting mixture, and steam distilling the resulting oil and thereby substantially removing therefrom contaminating liquids of relatively lower boiling point.

17. In apparatus of the class described, a mixing tank for oil and aqueous reagent, a separator fed from said tank, a tank for oil recovered in said separator, means for heating the contents of said oil tank, and means for vaporizing water by the heat of the oil and for contacting the water vapor with heated oil.

18. In an apparatus of the class described, a mixing tank for oil and aqueous reagent, a separator fed from said tank, a tank for oil recovered in said separator, means for heating the contents of said oil tank, and means for passing the vapor into heat exchange relation with the oil in co-directional variation by quantity with the temperature of the oil and for contacting the heated oil and resulting steam.

19. In apparatus of the class described, a mixing tank for oil and aqueous reagent, a separator fed from said tank, a tank for oil recovered in said separator, means for heating the contents of said oil tank, means for maintaining water in heat exchange relation with the oil, and means for regulating the quantity of water in such relation in co-directional variation by quantity with the temperature of the oil.

20. In an apparatus of the class described, a tank for oil, means for heating the contents of said tank, means for passing water into heat exchange relation with oil in the tank and for bringing the vapor thus formed into contact with the heated oil to further evaporation of contaminating liquids.

21. In an apparatus of the class described, a tank for oil, means for heating the contents of said tank, a steam generator in said tank in contact with oil therein and adapted to be heated thereby, and means for bringing into contact steam from said generator and oil from said tank.

22. In an apparatus of the class described, a tank for oil, means for heating the contents of said tank, and means for passing water into heat exchange relation with the heated oil in liquid state in co-directional variation by quantity with the temperature of the oil.

23. In an apparatus of the class described, a tank for oil, means for heating the contents of said tank, means for passing water into heat exchange relation with the oil in said tank and contacting therewith the resulting steam, and means for regulating the quantity of water in co-directional variation with the temperature of the oil.

24. In apparatus of the class described, a mixing tank for oil and reagent, a heater, a centrifugal machine, a distilling tank, a pump, and circulating means whereby the contents of either tank may be circulated through said heater or said centrifugal machine.

25. In apparatus of the class described, a tank for oil, means for heating the contents of said oil tank, a pipe from said tank to said heating means, a second pipe extending from said heating means to said tank, and means for contacting water vapor with oil flowing from said pipe extending to said tank.

26. In apparatus of the class described, a tank for oil, means for heating the contents of said oil tank, a pipe from said tank to said heating means, a second pipe extending from said heating means to said tank, and means for vaporizing water by the heat of the oil and contacting oil coming from the heater and the water vapor.

27. In apparatus of the class described, a tank, a heater for oil, means for spreading the oil in thin layers in said tank, and a steam generator in said tank, said generator being adapted to be heated by the oil and to discharge steam in contact with heated oil in thin layers.

28. In the distillation from oil of dissolved liquids of relatively lower boiling point, the process which comprises heating the oil, utilizing heat from the oil to vaporize water for use in steam distillation of the oil, bringing the water vapor into contact with the oil and controlling the production of water vapor by varying the quantity of water deriving heat from the oil co-directionally with the temperature of the oil.

29. In an apparatus of the class described, a tank for oil, means for heating the contents of said tank, heat exchange means in said tank for vaporizing water for action in the steam distillation of oil, means for dispersing oil in said tank to expose large surfaces thereof, and means for contacting said water vapor with the dispersed oil in said tank.

30. In apparatus of the class described, a chamber for oil, means in said chamber for dispersing oil to expose large surfaces thereof, means for heating the contents of said chamber, means for circulating liquid oil from the bottom of said chamber to said dispersing means, and means for bringing steam into contact with the oil so dispersed.

31. In the purification of oil that contains products of decomposition, free fatty acids, carbon particles, and relatively lower boiling contaminating liquids in solution, the process which comprises first mixing the oil with an aqueous alkaline reagent having the property of facilitating the passage of carbonaceous impurities from the oil into the aqueous phase of the resulting mixtures and sufficiently dilute that water soluble impurities and water soluble products of any reaction produced by the reagent will substantially all be in solution in the aqueous phase of the resulting mixture, separating impurities and the aqueous phase of the resulting mixture from the oil, and then removing contaminating liquids from the oil at temperatures below the boiling points of said contaminating liquids.

32. In apparatus of the class described, a tank for oil, means for heating the contents of said tank, a fluid container contacted by oil of said tank, means for supplying fluid to said container at a rate varying co-directionally with the temperature of the oil in the tank, and means conducting the vapor of the fluid from said container into contact with heated oil.

33. In the refining of oil to remove therefrom liquids of relatively low boiling point, the process which comprises maintaining a body of oil, supplying heat to said body of oil, bringing fluid into heat exchange relation with said body of oil at a rate varying co-directionally with the temperature of the oil, conducting the vapor of the fluid into contact with heated oil to assist evaporation therefrom of liquids of relatively lower boiling point.

In testimony whereof, I have signed my name to this specification.

LEE H. CLARK.